March 2, 1954     A. H. LAMB     2,671,208
VISUAL ALARM FOR AIRCRAFT INDICATORS AND THE LIKE
Filed Oct. 3, 1950
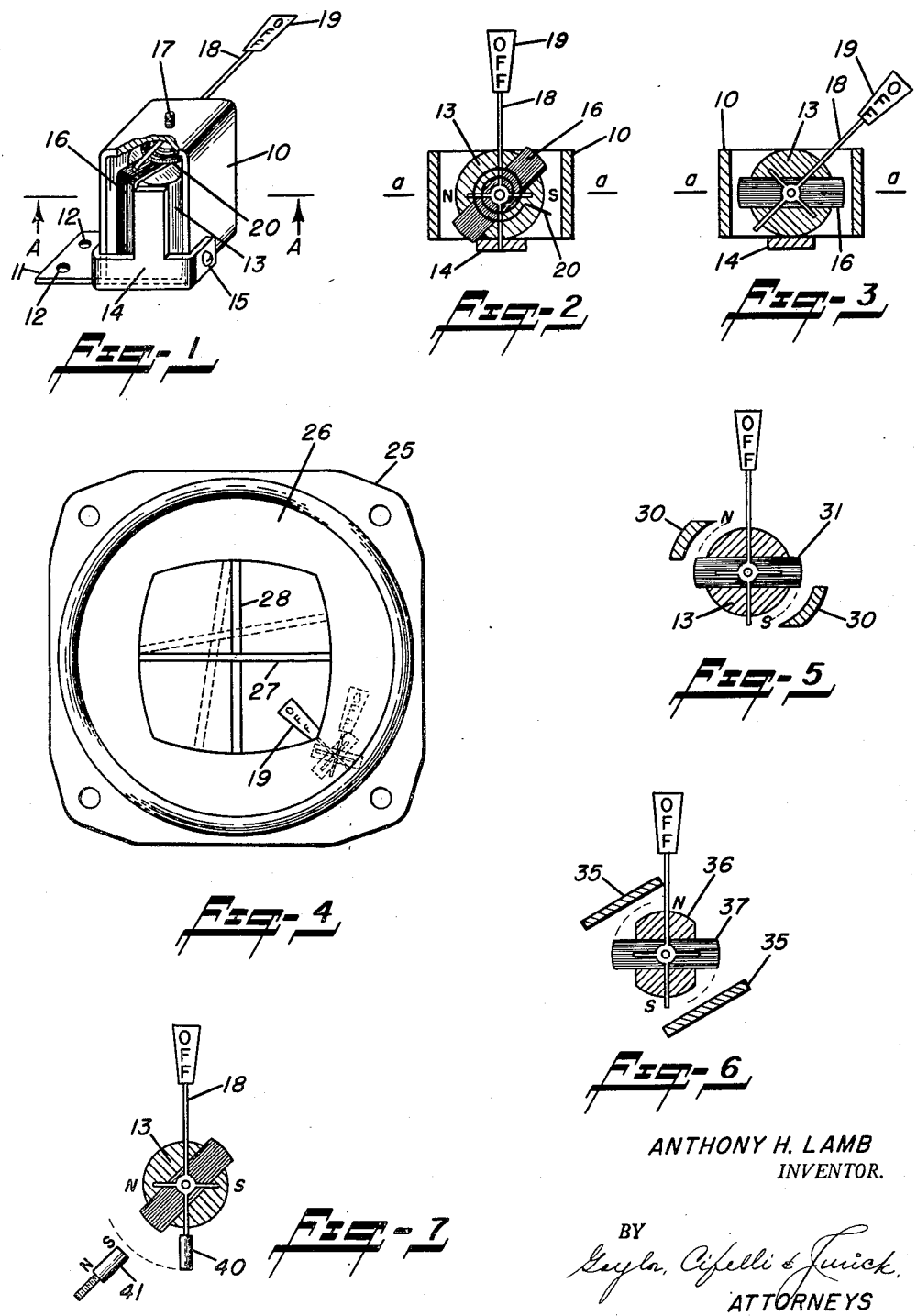
ANTHONY H. LAMB
INVENTOR.
BY
ATTORNEYS Patented Mar. 2, 1954

2,671,208

UNITED STATES PATENT OFFICE 2,671,208

VISUAL ALARM FOR AIRCRAFT INDICATORS AND THE LIKE

Anthony H. Lamb, Hillside, N. J., assignor to Weston Electrical Instrument Corporation, Newark, N. J., a corporation of New Jersey Application October 3, 1950, Serial No. 188,150

10 Claims. (Cl. 340—253)

This invention relates to a warning indicator and more particularly to an electrical mechanism adapted to provide a warning of definite character in response to a deviation from a predetermined value of the current flow in a pivoted movable coil.

In electrically actuated instruments and controllers it is often essential to know whether the circuits connected thereto are in proper operating condition so that the indications and/or control function may be relied upon. One such indicating system, wherein some means must be provided to denote proper functioning of the circuit, is the conventional aircraft flight indicator. In such system it is common practice to determine the orientation of the aircraft relative to radio beams of directive radiation. The indicator comprises a cross-pointer instrument, one pointer operating in a horizontal plane and the other in a vertical plane and the proper flight path of the aircraft is defined by the mid-point intersection of such pointers. Any deviation of the aircraft from the proper flight path results in a corresponding deflection of one or both pointers. One basic defect in such a system lies in the fact that the mechanisms actuating the indicator pointers are of the "zero center type." Consequently, the same balanced indication of the pointers obtains both when the system is operating properly and the aircraft is directly "on course," and when the instrument movable coils are unenergized.

Various proposals have been made to provide a warning when the system is not operating properly so that the pilot will not unknowingly be misled. For example, in one arrangement a failure in the system results in a biasing of the indicator pointers so that the pilot is urged to fly upwardly. In another arrangement a signal light is employed which is energized only when proper operating conditions prevail.

The present invention is directed to a novel and simple flag type indicator that provides a positive indication of the instantaneous condition of the circuit and associated equipment. It comprises, essentially, a permanent magnet, movable coil type of instrument including a flag type visual indicator. The magnetic circuit is so arranged that the movable coil operates in what may be termed a region of instability. Thus, when the current flowing through the movable coil is zero, or a predetermined small magnitude, the coil occupies a position determined by the mechanical torque of the conventional hair springs employed to conduct current into the movable coil. When, however, the current flow exceeds a predetermined magnitude, the coil rotates to a second position (that is well-spaced, angularly, from the first position), irrespective of the actual magnitude of such current flow. One or the other of the movable coil positions are indicated by a pointer, or other suitable means, as will be explained in detail hereinbelow.

An object of this invention is the provision of a visual warning alarm responsive to the deviation of electrical current from a predetermined magnitude.

An object of this invention is the provision of a permanent magnet, movable coil instrument in which the movable coil occupies one of two widely-separated positions depending upon whether the current flow through the coil falls below or exceeds a predetermined magnitude.

An object of this invention is the provision of a permanent magnet, movable coil instrument in which the angular deflection of the movable coil is not related directly to the specific magnitude of current flowing in the coil.

An object of this invention is the provision of a warning indicator for electrical circuits comprising a permanent magnet, a movable coil pivoted for angular rotation in the magnetic flux field, and an indicator secured to the movable coil, said indicator being either visible or obscured depending upon whether the current flow through the movable coil falls below or exceeds a predetermined magnitude.

An object of this invention is the provision of a warning indicator for electrical circuits comprising a permanent magnet, a soft-iron yoke forming a non-uniform flux gap with the magnet, a movable coil pivoted for rotation in said flux gap, means conducting current to the movable coil and a visual indicator secured to the said movable coil.

An object of this invention is the provision of an electrical indicator comprising a case, a permanent magnet, movable coil mechanism within the case, a pointer carried by the movable coil, said pointer being visible through the case when the current flow through the movable coil falls below a predetermined magnitude and said pointer being obscured when such current flow exceeds the predetermined magnitude.

These and other objects and advantages will be apparent from the following description when taken with the accompanying drawings illustrating several embodiments of the invention. The drawings are for purposes of illustration and are not to be construed as defining the scope or limits of the invention, reference being had for the latter purpose to the appended claims.

In the drawings wherein like reference characters denote like parts in the several views:

Figure 1 is an isometric view illustrating a flag alarm, warning mechanism made in accordance with this invention;

Figure 2 is, essentially, a cross-sectional view taken along the line A—A of Figure 1, but with the movable coil the top hair spring and pointer-flag drawn in plan view, to facilitate the description of the invention;

Figure 3 is similar to Figure 2 but showing the movable coil in a position wherein the magnetic flux density in the air gap is a maximum;

Figure 4 is a front view of an aircraft instrument of the crossed pointer type and showing the indicating member of my warning device visible through the cover glass of the instrument;

Figure 5 is similar to Figure 2 and shows another construction of the soft-iron yoke for obtaining a non-uniform magnetic flux gap;

Figure 6 illustrates still another embodiment of the invention; and

Figure 7 illustrates an arrangement including an auxiliary magnet adapted to attract an iron rider on the pointer tail to obtain an appreciable deflection angle of the movable coil in response to a relatively small, steady current flow through the coil.

Referring now to Figure 1, one structural arrangement, suitable for realizing the purposes of this invention, comprises a rectangular yoke 10 of soft-iron, said yoke being formed from a single piece of flat stock with one end 11 extending, as shown. This end includes the holes 12 which may serve to secure the entire device to a base, bracket or other mounting surface. A transversely-charged, permanent magnet 13, in the form of a cylinder, is soldered, welded or otherwise secured to a bracket 14, the latter preferably made of a non-magnetic material such as brass and secured to the yoke by the screws 15 that are threaded into taped holes provided in said yoke. A wire wound movable coil 16 is pivoted for rotation in the flux gap between the cylindrical magnet and the soft-iron yoke, the opposite sides of the yoke carrying threaded jewel screws for this purpose, one such jewel screw 17 being shown in the isometric view, Figure 1. The pivotal arrangement of a permanent magnet, movable coil instrument is well known and a detailed showing of the pivots, pivot bases and jewel bearings is not considered necessary in this case. It may here be stated conventional, spiral springs are employed to conduct current to the movable coil. One such spiral spring, the top spring 20, is shown in Figures 1 and 2. The mechanical and electrical arrangement of such hair springs are well known to those skilled in this art and, consequently, such details have been omitted from the drawings for purposes of clarity. Suffice to say that current flow through the movable coil causes the coil to rotate in a clockwise direction and the mechanical restraining torque of the springs opposes such coil rotation. The movable coil has a pointer 18 secured thereto, such pointer carrying a flat flag 19 which, in this instance, is marked "off."

In a conventional instrument, the magnetic flux in the gap between the magnet and yoke is uniformly distributed whereby the angular rotation of the movable coil is proportional to the magnitude of current flowing in the coil. In certain instances, the magnetic flux distribution is non-uniform to obtain desired deflection or scale characteristics but the movable coil always operates in a stable manner, that is, the rate of change in the magnetic flux field is such that the movable coil occupies a certain fixed position for each incremental increase in the current flowing therethrough, the exact coil position being determined by the magnetic flux density in the air gap and the mechanical torque exerted by the spiral hair springs through which current is directed into the coil.

If the movable coil is arranged to rotate into a magnetic flux field that increases at a rate greater than the mechanical torque exerted by the spiral hair springs then a constant, fixed magnitude of current flow through the movable coil will result in continued rotation of the coil. An arrangement somewhat of this character is utilized in the present invention.

Reference is now made to Figure 2, which is a cross-sectional view taken along the line A—A of Figure 1 but with the movable coil and pointer drawn in plan, for purposes of description and clarity. The cylindrical magnet 13 is magnetized in a direction transverse to its axis as indicated by the polar markings N and S. Inasmuch as the vertical sides of the soft-iron yoke 10 are monoplanar, it will be apparent the maximum magnetic intensity in the air gap between the magnet and the yoke is along the line $a, a$, and that such magnetic intensity, or flux, decreases on either side of this line. The mechanical torque exerted by the hair springs tends to rotate the movable coil 16 in a counter-clockwise direction whereby the coil abuts against the bracket 14 when no current flows through the coil winding. Consequently, the zero position of the movable coil is shown in Figure 2.

When current flows through the movable coil it rotates in a clockwise direction. In a conventional instrument the angular position of the movable coil is determined by the magnitude of the current flowing through the movable coil and the mechanical restraining force exerted by the hair springs, as the magnetic flux is uniformly distributed throughout the arcuate width of the air gap. In the present invention, however, the movable coil is arranged to operate in a non uniformly distributed flux field. Specifically, the rate of change of the magnetic flux intensity, in the direction of clockwise coil rotation, is greater than the corresponding rate of change of the restraining torque of the hair springs. Consequently, when the magnitude of the current flowing through the movable coil is sufficient to cause a slight angular movement of the coil from its zero position, the coil continues its clockwise rotation regardless of whether there is any further increase in the current within the coil. Motion of the coil continues until it occupies a position where the magnetic flux is a maximum, as shown in Figure 3. Upon a decrease in current flow, the coil rotates in a counterclockwise direction, in response to the control torque of the hair springs, to its original, zero position. It will now be clear that when the current flow through the movable coil is increased slowly from zero, the coil will remain stationary until the current magnitude is sufficient to overcome the restraining force of the hair springs, after which it moves to the position shown in Figure 3 without further increase in the current. Upon a slight reduction of the current from this critical magnitude, the coil rotates back to the mechanical zero position.

Thus, the coil occupies one of two extreme well-spaced positions depending upon whether the flow of current therethrough is greater than the predetermined, critical value. In the construction shown in Figures 2 and 3, the bracket 14 provides a stop to fix the mechanical zero position of the movable coil. The maximum angular rotation of the coil in a clockwise direction, in response to current flow substantially in excess of the critical value, may also be fixed by providing a suitable mechanical stop, as for example, when the pointer 18 or the flag 19 strikes the yoke 10.

From the above it is clear that the movable coil will occupy only one of two definite positions, namely, the zero position when the current flow therein is less than the critical value required to impart initial angular rotation, and a top position when such current flow equals or exceeds the critical value. By reason of the unstable nature of the system the coil will not come to rest in any region intermediate such end positions. This feature is employed to provide a positive visual warning indicator for electrical circuits.

In Figure 4 there is shown a front view of a crossed-pointer aircraft flight indicator. Such indicator comprises a case 25 provided with a cover glass and an opaque mask 26 forming a substantially rectangular window exposing to view the horizontal pointer 27 and the vertical pointer 28. These pointers are pivoted at one end and are actuated by suitable mechanisms fed from a radio signal receiver whereby any deviation of the aircraft from the proper flight path results in a corresponding change in the pointer positions as is shown, for example, by the dotted lines. The operation of such indicators is well known to those skilled in the art. As has been stated above, the basic defect in such system lies in the fact that mechanisms actuating the pointers are of the "zero center" type whereby the same balanced position of the pointers obtains both when the system is operating properly and the aircraft is "on course," and when the mechanisms are unenergized, as by an open electrical circuit. Therefore, some warning means must be provided to inform the pilot whether or not the indications may be relied upon. Toward this end a mechanism of the type herein described is inserted into the case 25 with the flag alarm 19 visible through the window when the movable coil of such mechanism occupies the zero position. The flag alarm warning mechanisms made in accordance with this invention may be made of very small size so that one or more of same are readily accommodated within the case of a conventional instrument. Circuitwise, the movable coil of the alarm mechanism is connected in series in the electrical circuit feeding the mechanism that actuates one of the indicator pointers, such as the pointer 27. Obviously a second such alarm mechanism may be mounted within the case 25 with its movable coil connected in series with the mechanism that actuates the indicator pointer 28. When the current flow in such series circuit exceeds a predetermined, minimum value the movable coil of the alarm mechanism rotates to its top position whereby the flag alarm 19 disappears behind the opaque mask 26 and the pilot, therefore, knows that he can rely upon the indications of the pointers 27, 28. If the current in the circuit falls below such predetermined value, due to a failure of any part of the operating circuit, the movable coil of the alarm mechanism returns to its zero position exposing the flag alarm 19 through the window. There is thus provided a positive, visual alarm warning the pilot that he cannot rely upon the indications of the flight instrument.

It is here pointed out that my novel alarm is not of the conventional on-off type wherein one indication is provided when the current flow is zero and another indication when the current flow is some finite value. In an aircraft indicator, such as that shown in Figure 4, the received radio signals may be weak yet the pointers 27, 28 will occupy a balanced, center position if such weak signals are of equal intensity. In such case, a conventional alarm device would result in an intermediate position of the visible alarm member, which only serves to confuse the pilot. In an alarm made according to this invention, the warning flag 19 occupies the top position (obscured from sight) so long as the current flow in the movable coil equals, or exceeds, a predetermined value. Such predetermined current value is chosen to correspond with the minimum, safe, received signal intensity. Consequently, as long as the flag 19 remains obscured from sight the pilot knows that the entire circuit is in proper operating condition and that the received signal intensity is at least sufficient for reliable operation of the entire apparatus. When, however, the received signals fall below the safe operating intensity, the flag 19 moves to what I have termed the "zero" position irrespective of the fact that all components are in good order circuitwise.

While I have described my alarm mechanism with specific reference to an aircraft flight indicator it will be apparent such mechanism may be employed in connection with many other types of indicators and/or controls to provide a positive, visual indication of the circuit condition.

Figure 5, which is similar to Figure 2, illustrates another construction of the alarm indicator wherein the soft-iron yoke 30 presents arcuate surfaces to the magnet 13. The movable coil 31 is shown in the zero position at which point the air gap between the magnet and yoke is of maximum radial length. With the magnet 13 magnetized transversely along a diametric line terminating in the polar markings N and S, and the air gap length being a minimum at such points, it will be apparent the magnetic flux increases rapidly in the clockwise direction from the zero coil position. Current flow through the movable coil will cause the latter to rotate a substantial distance in a clockwise direction, as already explained with reference to Figures 2 and 3.

Figure 6 illustrates another embodiment of the invention. In this case the yoke 35 has mono-planar sides and the magnet 36 is cut to form diametrically-opposed, parallel sides, as shown. With the magnet magnetized as indicated by the polar markings N and S the magnetic flux in the air gap will be a maximum in the region of the N, S poles of the magnet and will decrease rapidly to either side of such region. The movable coil 37 is shown in the zero position at which point the magnetic flux in the air gap is relatively very weak. Consequently, even with very weak hair springs, the coil will not rotate until the current flowing therein reaches a magnitude somewhat greater than that which would cause initial rotation of the coil in the Figure 2 or Figure 5 construction. Once this current magnitude is reached, or exceeded, the coil will rotate to its top mark position rapidly and positively, such top mark position being at the point of maximum flux density in the air gap. This construction is particularly useful when a relatively large angular rotation of the coil is required or desired, it being apparent the Figure 6 construction affords a coil rotation of 90 angular degrees or more.

It is here pointed out that the rotation of the movable coil from the zero position to the top position, and the angular spacing between such coil positions, is determined by the actual magnetic flux, the rate of change of the magnetic flux in the air gap, the mechanical strength of the hair springs and the rate of change of the spring torque per unit rotation of the movable coil. These factors may be so chosen that the movable coil will rotate from one to the other position as the current flow therein varies from a preselected or predetermined value. Thus, for example, the alarm mechanism may be designed so that the movable coil occupies the zero position when the current value is less than, say, 10 microamperes and will rotate quickly to the top position when the current equals or exceeds 10 microamperes. When the current falls below 10 microamperes the coil will return to its initial, zero position. The actual critical value of the current, for coil rotation, may be any specific value such as, say, 10 milliamperes, by proper consideration given to the factors above stated. In certain applications, the rate of flux change around the permanent magnet, sufficient to provide a coil rotation as hereinabove described, may be obtained without the use of a soft-iron yoke. In such case the return path for the magnetic flux is entirely through air. The flux density is a maximum at the N and S poles of the magnet and decreases substantially to zero in the neutral zone of the magnet, that is, in a plane bisecting the plane of the North and South magnetic poles. I, therefore, do not limit my invention to magnetic structures including a soft-iron return path for the magnetic flux.

An alarm indicator construction which does not include a soft-iron yoke is shown in Figure 7. The cylindrical magnet 13 is magnetized transversely with respect to its axis and the return path for the magnetic flux is air. In the event the rate of flux change is not sufficient to provide substantial angular deflection of the movable coil, for a constant current flow of relatively small magnitude, I provide an auxiliary magnet system comprising the soft-iron rider 40 secured to the tail of the pointer 18 and a bar magnet 41. The bar magnet 41 occupies a fixed position relative to the magnet 13 although the precise position thereof may be varied by adjustably mounting the magnet as indicated schematically in the drawing. Specifically, the radial spacing between the bar magnet 41 and the vertical axis of rotation of the movable coil may be set to a desired value to thereby set the intensity of magnetic attraction between the magnet and the rider 40 while the latter is within the field of influence of the magnet. As the current flow in the movable coil is increased gradually, the coil will begin to rotate when such current flow is sufficient to overcome the restraining torque of the hair springs. Continued increase of the current eventually produces sufficient coil rotation to bring the iron rider 40 into the field of influence of the bar magnet 41, whereupon the magnetic attraction between these two members overcomes the spring torque and results in a rapid rotation of the movable system to the point where the iron rider is radially aligned with the bar magnet. Upon a subsequent gradual decrease in the coil current the movable system will remain stationary until the mechanical torque exerted by the hair springs is sufficient to overcome the magnetic attraction between the magnet 41 and the rider 40, whereupon the coil returns to its initial or zero position. Obviously, the same result may be obtained if the rider 40 is also a permanent magnet. In the Figure 7 arrangement the movable coil may be supported for pivotal rotation around the cylindrical magnet 13 by a bracket made of non-magnetic material.

From the above description of the various embodiments of my invention it will be apparent I provide a simple mechanism of the permanent magnet, movable coil type wherein the movable coil, and a suitable, visual indicator, occupy only one of two definite and well-separated positions depending upon whether the current flow in the coil is less than or exceeds a predetermined, critical value.

Having now described my invention in detail in accordance with the patent statutes those skilled in the art will have no difficulty in making desired changes in the illustrated constructions to meet specific operating conditions or to adapt the alarm indicator to other specific uses. The precise formation of the non-uniform magnetic field may be accomplished in numerous ways and the construction of the individual components, and assembly thereof, is subject to a wide latitude of designs.

I claim:

1. An electrical mechanism comprising a permanent magnet, a non-uniform flux gap around the magnet wherein the magnetic intensity increases at a given rate, a pivotally-mounted movable coil rotatable in said flux gap in response to current flow in the coil, control springs for conducting current to the movable coil and normally biasing the coil to a position where the magnetic intensity in the flux gap is relatively weak, said springs providing a coil-rotation-restraining torque that increases at a rate less than the corresponding rate of increase of the magnetic intensity in the flux gap such that the coil rotates to a position where the magnetic intensity in the flux gap is a maximum when the current flow in said coil is of a magnitude just sufficient to overcome the initial coil-rotation-restraining torque of the springs.

2. The invention as recited in claim 1 and including a pointer attached to the movable coil, a rider of magnetic material secured to the pointer, a second permanent magnet spaced from the rider and adapted to attract said rider upon a predetermined angular rotation of the movable coil.

3. An electrical instrument of the type comprising a substantially cylindrical, transversely charged permanent magnet, a soft-iron yoke spaced from the magnet to form a flux gap wherein the magnetic intensity increases at a predetermined rate, a pivotally-mounted movable coil rotatable within the flux gap, control springs for conducting current to the coil and mechanical stops limiting the angular rotation of the coil to a selected portion of the flux gap, characterized by the fact that the magnetic flux in the selected portion of the flux gap increases at a rate greater than the corresponding increase in the coil-rotation restraining torque of the control springs, whereby the movable coil occupies a first position defined by one of the mechanical stops when the current flow therein is of a magnitude insufficient to overcome the initial coil-rotation-restraining torque of the control springs and a second position defined by the other mechanical stop when such current flow is of a magnitude just sufficient to overcome the initial coil-rotation-restraining torque of the control springs.

4. An electrically-actuated, visual warning device comprising a transversely-charged permanent magnet; a soft-iron yoke spaced from the magnet, said yoke forming a varying flux gap with said magnet and in which the magnetic intensity increases at a predetermined rate; a pivotally-mounted movable coil rotatable in the flux gap; control springs for conducting current to the movable coil, said springs normally biasing the coil to a zero position and said springs providing a coil-restraining torque that increases at a rate less than the corresponding rate of increase of the magnetic intensity in the flux gap; and a visual indicator member secured to and rotatable with the said movable coil.

5. The invention as recited in claim 4, wherein the magnet is a solid cylinder and the said yoke has parallel, mono-planar sides spaced from the magnet to form the varying flux gap.

6. The invention as recited in claim 4, wherein the magnet is a solid cylinder and the said yoke has arcuate sides spaced from the magnet to form the varying flux gap.

7. The invention as recited in claim 4, wherein the magnet is a cylinder having diametrically opposed flat faces and is transversely charged in a direction parallel to such flat faces, and the said yoke has flat sides disposed at an angle relative to the magnetic axis of the magnet.

8. A visual warning indicator responsive to electrical current comprising a cylindrical, transversely-charged magnet; a soft-iron yoke spaced from said magnet to form a flux gap in which the magnetic intensity increases at a predetermined rate; a pivotally-mounted movable coil rotatable in the flux gap; control springs for conducting current to the movable coil, said springs normally biasing the coil to a zero position, and said springs providing a coil-restraining torque that increases at a rate less than the corresponding increase in the magnetic intensity in the flux gap for a given angular deflection of the coil; a pointer carried by the movable coil; and a flat flag-alarm carried by the pointer.

9. The invention as recited in claim 8 in combination with an opaque member overlying the visual warning indicator and having an opening therein, the said flag alarm being hidden by the opaque member when the movable coil is in the zero position and said flag alarm being visible through the opening in the opaque member when the magnitude of the current flow in the movable coil is of a value just sufficient to overcome the initial coil-restraining torque of the control springs.

10. In an instrument of the class including a housing having a window and a current-responsive member carrying a pointer visible through the window, the combination of a magnetic structure including an associated flux gap wherein the magnetic intensity increases at a predetermined rate, a pivotally-mounted movable coil rotatable in the flux gap, control springs for conducting current to the movable coil and normally biasing the coil to a first position where the magnetic intensity in the flux gap is relatively low, said control springs having a coil-rotation-restraining torque that increases at a rate less than the corresponding rate of increase of the magnetic intensity in the flux gap, circuit elements connecting the current-responsive member and the said movable coil in series, a visual indicator carried by the movable coil, an opaque mask overlying the visual indicator and including an opening, said visual indicator being hidden from view when the movable coil is in the said first position and said indicator being visible through the said opening when the current flow in the movable coil has a magnitude just sufficient to overcome the initial coil-restraining torque of the said control springs.

ANTHONY H. LAMB.

References Cited in the file of this patent

UNITED STATES PATENTS

| Number | Name | Date |
| --- | --- | --- |
| 1,131,202 | Boyden | Mar. 9, 1915 |
| 1,960,848 | Jones | May 29, 1934 |
| 2,084,995 | Barbulesco | June 29, 1937 |
| 2,354,902 | Wolferz | Aug. 1, 1944 |
| 2,405,429 | Jewell | Aug. 6, 1946 |
| 2,411,010 | Stimson | Nov. 12, 1946 |
| 2,430,782 | Poole | Nov. 11, 1947 |